United States Patent
Boonekamp et al.

(10) Patent No.: US 6,570,302 B1
(45) Date of Patent: May 27, 2003

(54) ELECTRIC LAMP WITH LIGHT-ABSORBING MEDIUM AND INTERFERENCE FILM

(75) Inventors: Erik Paul Boonekamp, Eindhoven (NL); Mathias Hubertus Johannes Van Rijswick, Eindhoven (NL); Hendrik Adrianus Van Sprang, Eindhoven (NL); Gerhard Hebbinghaus, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 246 days.

(21) Appl. No.: 09/671,127

(22) Filed: Sep. 27, 2000

(30) Foreign Application Priority Data

Sep. 30, 1999 (EP) .............................. 99203191

(51) Int. Cl.⁷ .................... H01J 5/16; H01J 61/40; H01K 1/26; H01K 1/30
(52) U.S. Cl. ................ 313/113; 313/112; 313/493; 313/635
(58) Field of Search ................ 313/113, 112, 313/489, 493, 634, 635, 636

(56) References Cited

U.S. PATENT DOCUMENTS

| | | | |
|---|---|---|---|
| 3,599,029 A | * 8/1971 | Martyny | 313/489 |
| 3,814,973 A | * 6/1974 | Thouret et al. | 313/313 |
| 4,315,186 A | * 2/1982 | Hirano et al. | 313/111 |
| 5,087,523 A | * 2/1992 | Sigai et al. | 428/404 |
| 5,353,210 A | * 10/1994 | Strok et al. | 362/293 |
| 5,469,018 A | * 11/1995 | Jacobsen et al. | 313/461 |
| 5,608,227 A | * 3/1997 | Dierks et al. | 250/492.1 |
| 5,627,426 A | * 5/1997 | Whitman et al. | 313/116 |
| 5,831,375 A | * 11/1998 | Benson, Jr. | 313/110 |
| 5,834,904 A | * 11/1998 | Waymouth | 315/248 |

FOREIGN PATENT DOCUMENTS

| | | | |
|---|---|---|---|
| DE | 8600640 | 7/1986 | H01K/1/32 |
| DE | 4432315 | 3/1996 | H01J/61/86 |
| EP | 0657752 A1 | 6/1995 | G02B/5/28 |

OTHER PUBLICATIONS

Patent Abstract of Japan Publication #03192649 Date of Publication: Aug. 22, 1991.
Patent Abstract of Japan Publication #06096745 Date of Publication: Apr. 8, 1994.

* cited by examiner

*Primary Examiner*—Vip Patel
*Assistant Examiner*—Kevin Quarterman
(74) *Attorney, Agent, or Firm*—Frank Keegan

(57) ABSTRACT

The electric lamp comprises a lamp vessel (11) which transmits visible light and which accommodates a light source (12). The electric lamp comprises a light-absorbing medium (16). The lamp vessel (11) is covered with an optical interference film (15) which comprises layers composed of a first layer of silica and a second layer of a material having a relatively high refractive index which alternate with each other. According to the invention, light from the light source (12) travels through the light-absorbing medium (16) before reaching the interference film (15). Preferably, the light-absorbing layer (16) is disposed between the lamp vessel (11) and the interference film (15). Alternatively, the light-absorbing layer is contained in a wall of the lamp vessel. Preferably, the interference film (15) reflects substantially in the same wavelength range as that wherein the light-absorbing medium (16) absorbs, preferably in the range from 570 to 620 nm. Preferably, the electric lamp emits, in operation, colored light but has a color-neutral appearance when the lamp is in the off-state. The light-absorbing layer (16) preferably predominantly comprises $Nd_2O_3$, $CoAl_2O_4$, $Fe_2O_3$, $ZnFe_2O_4$, $ZnO.Fe_2O_4$ or $BiVO_4$.

12 Claims, 6 Drawing Sheets

ELECTRIC LAMP WITH LIGHT-ABSORBING MEDIUM AND INTERFERENCE FILM

BACKGROUND OF THE INVENTION

The invention relates to an electric lamp comprising a light-transmitting lamp vessel wherein a light source is arranged, said electric lamp comprising a light-absorbing medium, and at least a part of the lamp vessel being provided with an interference film.

Such lamps are predominantly used for general illumination purposes, for example as efficient replacements for incandescent lamps. Said electric lamps are further used in so-called sign and contour illumination, signal illumination such as in traffic lights, and projection illumination and fiber optics illumination. Such electric lamps are also used for automotive applications, for example as headlamps or indicator lamps in vehicles, for example as an amber-colored light source in indicators or as red-colored light source in brake lights of automobiles. Alternative embodiments of such lamps, wherein the color temperature is increased by means of a light-absorbing coating, can also be used as a headlamp of a vehicle.

An electric lamp of the type mentioned in the opening paragraph is known from DE-GM 86 00 640. In the known electric lamp, an interference film reflecting blue light is provided on the lamp vessel of a halogen incandescent lamp for use in automobiles, and a light-absorbing medium is provided on an opaque part of the inner surface of the lamp vessel.

A drawback of lamps comprising a light-absorbing medium provided on an opaque part of the inner surface of the lamp vessel is that the effectiveness of the light-absorbing medium is relatively small.

It is an object of the invention to provide an electric lamp of the type described in the opening paragraph, wherein said drawback is obviated.

In accordance with the invention, the electric lamp of the type described in the opening paragraph is characterized in that light originating from the light source reaches the interference film mainly via the light-absorbing medium.

In the known lamp, light generated in the lamp vessel is only absorbed by the light-absorbing medium if the light generated is (accidentally) directed such that it is incident on the light-absorbing medium. Since, in the known lamp, the light-absorbing medium is provided only on a relatively small surface in the lamp vessel, namely the opaque part of the inner surface of the lamp vessel, the light-absorbing effect of the light-absorbing medium is relatively small. After all, the major part of the inner surface of the lamp vessel is light-transmitting. Light which is reflected by the interference film often reaches the light-absorbing medium only after multiple reflections. Consequently, there is only a relatively small chance that the reflected light ultimately reaches the light-absorbing medium and that said reflected light is absorbed in said light-absorbing medium. As a result, a substantial part of the reflected light is still emitted by the state-of-the-art electric lamp, which substantially reduces the intended effect of the interference film. The effectiveness of the absorption by the light-absorbing medium is considerably increased by providing the light-absorbing medium, in accordance with the measure of the invention, in such a manner that light originating from the light source reaches the interference film via the light-absorbing medium.

The light-absorbing medium can be provided in the electric lamp in different ways.

An embodiment of the electric lamp in accordance with the invention is characterized in that a wall of the lamp vessel comprises the light-absorbing medium.

Light-absorbing media can be readily incorporated in the wall of the lamp vessel which is made, for example, of glass, such as quartz glass or hard glass, or of a translucent ceramic. In this embodiment, the interference film is preferably applied directly to a side of the wall of the lamp vessel which faces away from the light source. Since the light-absorbing medium is provided in the wall of the lamp vessel and the interference film, light reflected by the interference film passes through the light-absorbing medium twice, which leads to a further improvement of the effectiveness of the absorption process. In addition, light which is reflected to and fro between the interference film on both sides of the lamp vessel passes through the light-absorbing medium twice at every reflection.

An alternative embodiment of an electric lamp in accordance with the invention is characterized in that the light-absorbing medium comprises a light-absorbing layer which is situated between the lamp vessel and the interference film.

Since the light-absorbing medium is provided between the outside surface of the lamp vessel and the interference film, light reflected by the interference film passes through the light-absorbing medium twice, which causes the effectiveness of the absorption process to be further improved. In addition, light which is reflected to and fro between the interference film on both sides of the lamp vessel, passes through the light-absorbing layer twice at every reflection.

In the known lamp, a light-absorbing medium in the form of a light-absorbing layer is applied to an inner surface of the lamp vessel, the light-absorbing layer being exposed to the halogen atmosphere in the lamp vessel. Under the influence of this relatively aggressive atmosphere, the light-absorbing layer is damaged, leading to a further reduction of the effectiveness of said light-absorbing layer. It is also possible that parts of the light-absorbing layer become detached from their base and end up in the atmosphere of the lamp vessel. Such detached parts may adversely affect the lamp atmosphere in the lamp vessel, for example the so-called tungsten cycle. In addition, deposits on a light-transmitting part of the inner surface of the lamp vessel (blackening) cause the efficiency of the lamp to decrease. By applying the light-absorbing layer at a side of the wall of the lamp vessel which faces away from the light source, the influence of the light-absorbing medium on the atmosphere in the lamp vessel is annihilated.

In an alternative embodiment of an electric lamp, the light-absorbing medium is provided on an inner surface of the lamp vessel.

The light-absorbing properties of the light-absorbing medium provided in accordance with the measure of the invention are improved, in particular, if the interference film reflects in a wavelength range wherein the light-absorbing medium absorbs. A favorable embodiment of the electric lamp in accordance with the invention is characterized in that the interference film reflects predominantly in a wavelength range wherein the light-absorbing medium absorbs.

The synergistic effect obtained by this measure resides in that the reflective power of the interference film is tailored to meet the absorbing properties of the light-absorbing medium. The light which originates from the light source and wants to issue to the exterior through the lamp vessel is partly absorbed by the light-absorbing medium, whereby the magnitude of the part absorbed depends upon the thickness of the light-absorbing medium and the effectiveness of the absorption process. Part of the light which is allowed to pass by the light-absorbing medium, however, has a wavelength in the wavelength range which should be absorbed by the light-absorbing medium. As a result of the fact that, in accordance with said embodiment of the invention, the interference film is designed so that, in particular, this light which has been allowed to pass is reflected, this reflected light again passes through the light-absorbing medium so that a further part of this light is absorbed. In such cases, after having passed through the light-absorbing medium twice, part of the light, which is absorbed by the light-absorbing medium, will still be present in the lamp vessel. This light will try to leave the lamp vessel at a different location (for example at the opposite side of the lamp vessel). At this other location, said remaining part of the light will again meet a barrier in the form of a light-absorbing medium in combination with an interference film which reflects in the wavelength range wherein the light-absorbing medium absorbs. As a result of multiple absorption and reflection, eventually only a small part of the light emitted by the light source, and having a wavelength which is absorbed by the light-absorbing medium, will be emitted by the electric lamp.

The above-mentioned synergistic effect of multiple absorption and reflection enables a further object of the invention to be realized. It is a further object of the invention to increase the color temperature of the electric lamp by means of a suitable combination of a light-absorbing medium and an interference film applied to an outside surface of the lamp vessel.

In order to bring about an increase of the color temperature $T_c$, in general, an excision is made in the visible spectrum of the electric lamp, preferably in the yellow-orange range, in the wavelength range around 590 nm. To achieve this object, in general, a selectively absorbing layer or a selectively reflecting interference film is applied to an outside surface of the lamp vessel. A substantial increase of the color temperature generally brings about a substantial loss of lumen. Without being obliged to give any theoretical explanation, the minimum loss of lumen output, which is associated with a certain shift of the color temperature as a result of an interference film reflecting a certain spectral band (a so-called Schrbdinger interference film) is 10% for a shift of the color temperature from 2850 K to 3000 K. For a shift of the color temperature from 2850 K to 3500 K the minimum loss of lumen is 32%. Further drawbacks of such "steep band" interference films are the complexity of such interference films and a substantial deterioration of the color rendering index. Interference films having a reduced "steep band" character cause a higher loss of lumen but, simultaneously, a smaller reduction of the color rendering index.

The choice of selectively light-absorbing layers is limited by the thermal requirements to be met by such a layer. Such thermal requirements include the durability of the light-absorbing medium during the service life of the lamp vessel and the resistance to changing temperatures of the lamp vessel. A further drawback of light-absorbing layers resides in that suitable materials generally absorb (visible) light in too wide a wavelength range. In addition, it is practically impossible to bring about a specific shift of the color point by means of a light-absorbing medium and, at the same time, remain on the so-called blackbody locus, i.e. keep the light emitted by the electric lamp sufficiently "white".

In general, interference films provide greater freedom to obtain a desired transmission spectrum. A "drawback" of interference films is that the light is generally only reflected, not absorbed, by the interference film. When use is made of interference films, the shift in color temperature depends upon absorptions taking place in the electric lamp. These internal absorptions depend upon the geometry of the lamp vessel and the size and position of the incandescent wire and of the pinch or pinches. If the absorption is determined only by these internal absorptions, then the contribution to the absorption is relatively small. Also in the known lamp, wherein a light-absorbing medium is provided on an opaque part of the inner surface of the lamp vessel, the contribution to the absorption still is relatively small. As a result of this small absorption, the reflectivity of the interference film must be relatively high to make sure that the "undesirable" light is reflected so often and so effectively that this undesirable light ultimately disappears somehow from the light emitted by the electric lamp. An interference film having a high reflectivity implies a relatively large number of layers from which the interference film is built up and steep filter edges. Due to both measures, interference films are expensive, and they additionally cause a substantial decrease in color rendition, which is undesirable. In addition, the shift in color temperature will differ substantially from lamp to lamp if the internal absorptions are not well known and/or cannot be properly controlled.

The inventors have recognized that a suitable combination of a light-absorbing medium and an interference film applied to an outside surface of the lamp vessel enables the color temperature of the electric lamp to be increased at a relatively small reduction of the lumen output and the color rendition of the lamp. The combination of a light-absorbing medium and an interference film, with the light-absorbing medium being arranged between the light source and the interference film, has a number of advantages, for example, if the light-absorbing medium is situated in the wall of the lamp vessel or if the interference film is applied to the light-absorbing layer provided on an outside surface of the lamp vessel. In the first place, light reflected by the interference film passes through the light-absorbing medium twice, which further improves the effectiveness of the absorption process. Furthermore, light which is reflected to and fro between the interference film on both sides of the lamp vessel passes through the light-absorbing medium twice at each reflection. In addition, the interference film can contribute to the desired shift of the color temperature. A further important advantage resides in that the greater freedom in designing the interference film makes it possible to compensate for the undesirable movement of the color point away from the blackbody locus as a result of the shift of said color point caused by the light-absorbing medium (and the interference film). The interference film is used, as it were, to re-position the color point of the combination of light-absorbing medium and interference film on the blackbody locus, whereby the light emitted by the electric lamp maintains a sufficiently "white" appearance. The interference film also enables an effective shift of the color point to be effected, whereby the loss of light of the electric lamp is limited while, simultaneously, the color rendering index of the electric lamp remains relatively high.

An embodiment of the invention is characterized in that the light-absorbing medium absorbs mainly in a wavelength range from 570 to 620 nm. Such a light-absorbing layer absorbs selectively in the yellow-orange range and has a relatively low absorption in the blue-green range of the spectrum. The light-absorbing medium is provided on an outside surface of the lamp vessel. An interference film which reflects predominantly in the same wavelength range is applied to this light-absorbing layer. As a result of multiple reflections at the interference film, light to which the light-absorbing medium is sensitive is at least substantially completely absorbed by the light-absorbing medium.

A further synergistic effect of multiple absorption and reflection makes it possible to realize yet another object of the invention. Another object of the invention is to change the color impression of the electric lamp by means of a suitable combination of a light-absorbing medium and an interference film provided on an outside surface of the lamp vessel. The aim is, in particular, to unlink the impression given by the electric lamp in the off-state from the color of the light emitted by the electric lamp in the on-state. The object is, in particular, to provide an electric lamp which, in operation, emits light of a certain color, for example a so-called amber-colored electric lamp, while the electric lamp has a color-neutral appearance in the off-state.

Preferably, the light-absorbing medium is selected from the group formed by iron oxide, iron oxide doped with phosphor, zinc iron oxide, cobalt aluminate, neodymium oxide, bismuth vanadate, zirconium praseodymium silicate or mixtures thereof. Iron oxide ($Fe_2O_3$) is an orange pigment and P-doped $Fe_2O_3$ is an orange-red pigment. Zinc iron oxide, for example $ZnFe_2O_4$ or $ZnO.Zn\ Fe_2O_4$ are yellow pigments. By mixing (P-doped) $Fe_2O_3$ and $ZnFe_2O_4$, a pigment having a deep orange color is obtained. Cobalt aluminate ($CoAl_2O_4$) and neodymium oxide ($Nd_2O_5$) are blue pigments. Bismuth vanadate ($BiVO_4$), also referred to as pucherite, is a yellow-green pigment. Zirconium praseodymium silicate is a yellow pigment.

A thickness $t_{abs}$ of the light-absorbing medium preferably lies in the range $50 \leq t_{abs} \leq 1000$ nm. If the thickness of the light-absorbing layer is smaller than 50 nm, absorption hardly takes place and the intended shift of the color temperature is achieved to an insufficient degree. If the thickness of the layer exceeds 1000 nm, then too much light is absorbed which adversely affects the lumen output of the electric lamp.

An embodiment of the electric lamp in accordance with the invention is characterized in that the interference film comprises layers composed of, alternately, a first layer of a material having a relatively low refractive index and a second layer of a material having a relatively high refractive index. The use of two materials simplifies the provision of the interference film. In an alternative embodiment, use is made of at least a third layer of a material having a refractive index between that of the first layer and the second layer.

A preferred embodiment of the electric lamp in accordance with the invention is characterized in that the first layer of the interference film predominantly comprises silicon oxide, and the second layer of the interference film predominantly comprises a material having a refractive index which is high with respect to a refractive index of silicon oxide. Layers of silicon oxide can be relatively readily applied by means of various deposition techniques.

Preferably, the interference film comprises at least 3 and at the most approximately 10 layers. As a result of the relatively small number of layers, the reflection spectrum of the interference film is relatively uniform. In addition, the manufacturing cost of such an interference film is relatively low. A particularly favorable effect of such an interference film is that the influence on the color rendition of the electric lamp is relatively small.

Preferably, the second layer of the interference film comprises a material which is selected from the group formed by titanium oxide, niobium oxide, tantalum oxide, zirconium oxide, hafnium oxide, silicon nitride and combinations of said materials.

Preferably, the material of the second layer of the interference film predominantly comprises niobium oxide or silicon nitride.

The light source of the lamp may be an incandescent body, for example in a halogen-containing gas, but it may alternatively be an electrode pair in ionizable gas, for example an inert gas with metal halogenides, possibly with, for example, mercury as the buffer gas. The light source may be surrounded by an inner gastight envelope. It is also possible that an outer envelope surrounds the lamp vessel.

The interference film and the light-absorbing layer may be provided in a customary manner, for example by vapor deposition (PVD: physical vapor deposition) or (dc) (reactive) sputtering or by means of a dip coating or spraying process or by means of LP-CVD (low-pressure chemical vapor deposition), PE-CVD (plasma-enhanced CVD). $CoAl_2O_4$ is preferably applied as a light-absorbing layer on the outside surface of the lamp vessel by means of dip coating. The light-absorbing medium $Nd_2O_3$ is preferably provided as a dopant in the wall of the lamp vessel.

It has been found that the combination of absorbing medium and interference film causes the electric lamp in accordance with the invention to substantially preserve its initial properties during the service life of the electric lamp.

BRIEF DESCRIPTION OF THE DRAWINGS

These and other aspects of the invention will be apparent from and elucidated with reference to the embodiments described hereinafter.

In the drawings.

The drawings are purely diagrammatic and not drawn to scale. Particularly for clarity, some dimensions are exaggerated strongly. In the drawings, like reference numerals refer to like parts whenever possible.

DETAILED DESCRIPTION OF THE PREFERRED EMBODIMENTS

Figure 1A:
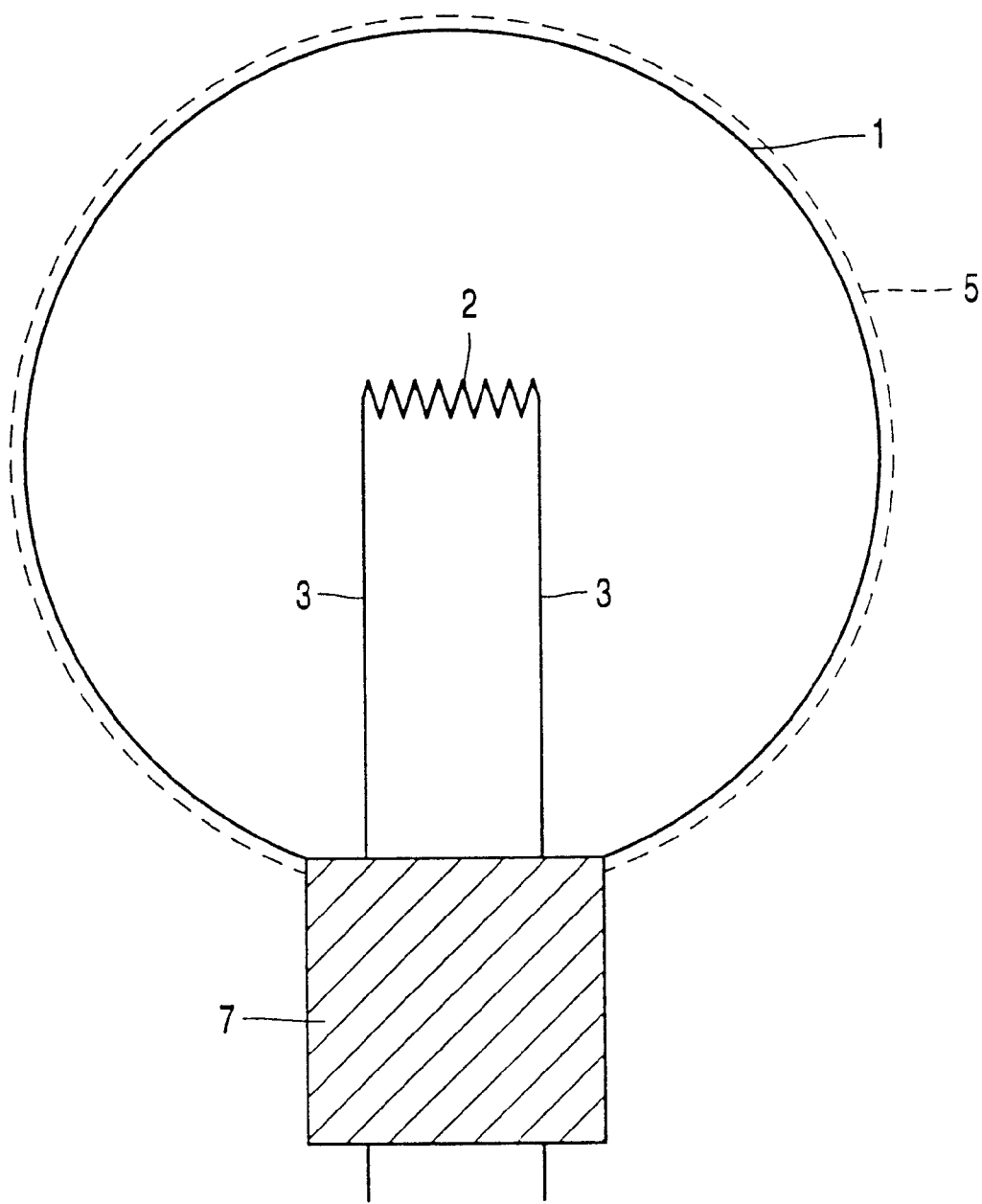
FIG. 1A is a cross-sectional view of an embodiment of the electric lamp in accordance with the invention.

FIG. 1A is a cross-sectional view of an embodiment of the electric lamp in accordance with the invention. Said electric lamp has a light-transmitting lamp vessel 1, for example of glass, which is sealed in a gastight manner and which accommodates an electric element 2, in the Figure a (spiral-shaped) tungsten incandescent body 7, which is connected to current conductors 3 which issue from the lamp vessel 1 to the exterior. The lamp shown is filled with an inert gas, for example an Ar/Ne mixture, having a filling pressure of slightly more than 5 bar. In the example shown in FIG. 1A, the wall of the lamp vessel is provided with the light-absorbing medium. The wall of the lamp vessel (having a thickness of approximately 0.7 mm) consists, for example, of glass comprising predominantly 65% by weight $SiO_2$, 16% by weight $Na_2O$ and 6% by weight CaO, which contains, for example, 8–10% by weight $Nd_2O_3$. The incorporation of $Nd_2O_3$ in the wall of the lamp vessel has various advantages. Should the lamp vessel be coated with a coating layer of $Nd_2O_3$, then a thickness of more than $1\mu$ (for example more than 10 $\mu$m) would be necessary to attain the same light-absorbing effect. Since $Nd_2O_3$ is an expensive material, such a solution would adversely affect the cost price of the lamp. In addition, the presence of such a thick coating layer readily leads to bonding problems, which are increased if an interference film is applied to such a light-absorbing layer.

In FIG. 1A, an interference film 5 is applied to the wall of the lamp vessel 1 (the "substrate"), which interference film comprises layers composed of, alternately, a first layer of predominantly silicon oxide (average refractive index approximately 1.45) and a second layer of a material having a relatively high refractive index, in this example titanium oxide (average refractive index approximately 2.4). The $SiO_2/TiO_2$ interference film preferably comprises only a small number of layers. Experiments have shown that an interference film comprising ten layers of $SiO_2/TiO_2$ is sufficient to obtain the desired effects.

Figure 1B:
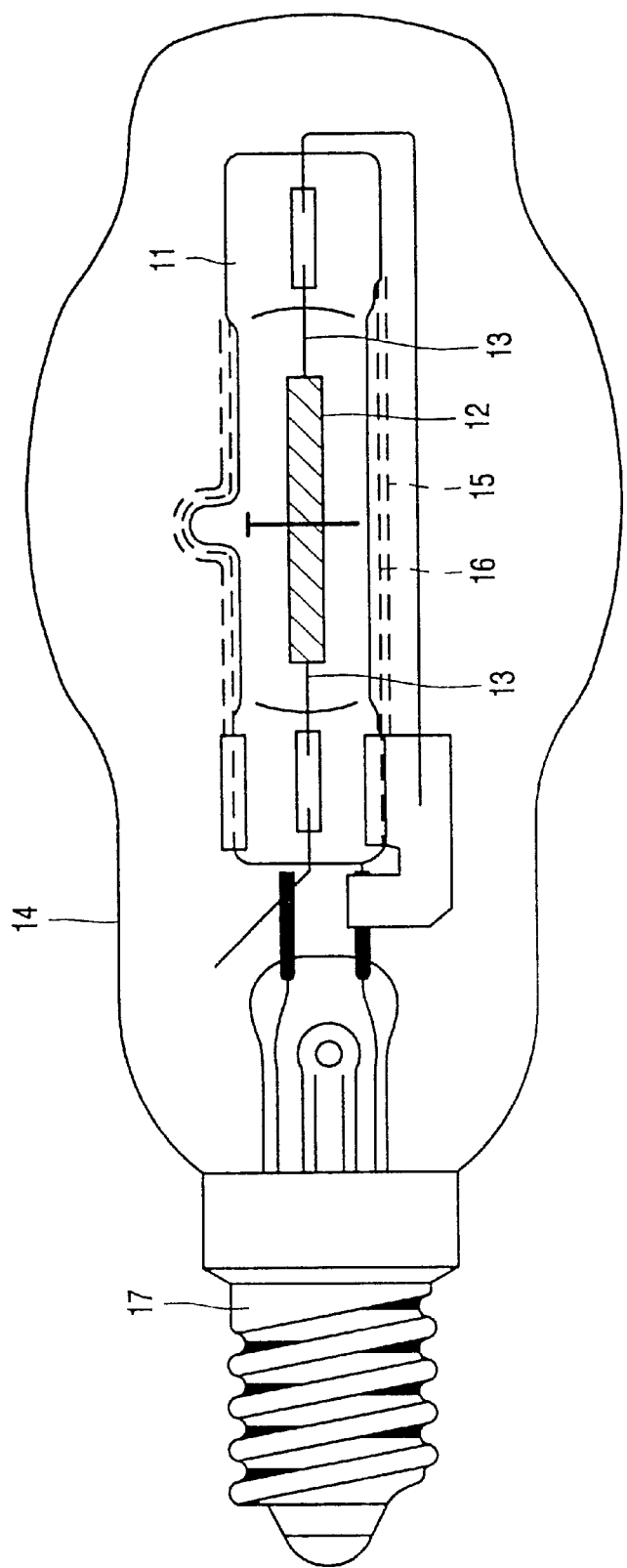
FIG. 1B is a side view of an alternative embodiment of the electric lamp in accordance with the invention.

In an alternative embodiment of the electric lamp as shown in FIG. 1A, the light-absorbing medium is provided in the form of a light-absorbing coating on an outside surface of the lamp vessel 1 (on a wall of the lamp vessel) on which the interference film 5 is provided (also see FIG. 1B). In this case, the light-absorbing coating comprises, for example, a layer of $Fe_2O_3$ in a thickness of, for example, 50–150 nm. An electric lamp provided with such a $Fe_2O_3$ layer emits, in operation, amber-colored light. Such electric lamps are used as an indicator lamp in, for example, indicators of automobiles and have a service life of at least substantially 6000 hours.

FIG. 1B is a side view of an alternative embodiment of the electric incandescent lamp in accordance with the invention. The electric lamp comprises a quartz glass lamp vessel 11 accommodating an incandescent body as the light source 12. Current conductors 13 are connected to said light source and issue from the lamp vessel 11 to the exterior. The lamp vessel 11 is filled with a halogen-containing gas, for example hydrogen bromide. At least a part of the lamp vessel 11 is covered with a light-absorbing medium 16 in the form of a light-absorbing coating which, in this example, is formed by $CoAl_2O_4$ having a layer thickness of, for example, 250–1000 nm.

In the example shown in FIG. 1B, an interference film 15 is applied to the light-absorbing medium 16 and comprises layers composed of, alternately, a first layer of predominantly silicon oxide (average refractive index approximately 1.45) and a second layer of a material having a relatively high refractive index, in this example niobium oxide (average refractive index approximately 2.35). The $SiO_2/Nb_2O_5$ interference film preferably comprises only a limited number of layers. Experiments have surprisingly shown that an interference film comprising three layers of $SiO_2/Nb_2O_5$ is sufficient to obtain the desired effects.

In FIG. 1B, the lamp vessel 11 is mounted in an outer bulb 14 which is supported by a lamp cap 17 to which the current conductors 13 are electrically connected. The lamp shown is a 60 W mains-voltage lamp having a service life of at least substantially 2000 hours.

Table I, II and III show three embodiments of combinations of a light-absorbing layer comprising cobalt aluminate and $SiO_2/Nb_2O_5$ interference films. Regarding cobalt aluminate, experiments based on different layer thicknesses, namely 260 nm and 500 nm, have been carried out. For the interference film use has been made of one three-layer and two different seven-layer $SiO_2/Nb_2O_5$ interference films.

TABLE I

Embodiment of a first combination of a light-absorbing layer and an interference film (IF-1).

| Layer | Material | Thickness (nm) |
|---|---|---|
|  | Substrate | — |
| 1 | $CoAl_2O_4$ | 260 or 500 |
| 2 | $Nb_2O_5$ | 84 |
| 3 | $SiO_2$ | 97 |
| 4 | $Nb_2O_5$ | 68 |
|  | Air | — |

TABLE II

Embodiment of a second combination of a light-absorbing layer and an interference film (IF-2).

| Layer | Material | Thickness (nm) |
|---|---|---|
|  | Substrate | — |
| 1 | $CoAl_2O_4$ | 500 |
| 2 | $Nb_2O_5$ | 20 |
| 3 | $SiO_2$ | 145 |
| 4 | $Nb_2O_5$ | 85 |
| 5 | $SiO_2$ | 89 |
| 6 | $Nb_2O_5$ | 56 |
| 7 | $SiO_2$ | 376 |
| 8 | $Nb_2O_5$ | 93 |
|  | Air | — |

TABLE III

Embodiment of a third combination of a light-absorbing layer and an interference film (IF-3).

| Layer | Material | Thickness (nm) |
|---|---|---|
|  | Substrate | — |
| 1 | $CoAl_2O_4$ | 500 |
| 2 | $Nb_2O_5$ | 134 |
| 3 | $SiO_2$ | 134 |
| 4 | $Nb_2O_5$ | 73 |
| 5 | $SiO_2$ | 93 |
| 6 | $Nb_2O_5$ | 52 |
| 7 | $SiO_2$ | 375 |
| 8 | $Nb_2O_5$ | 88 |
|  | Air | — |

Figure 2A:
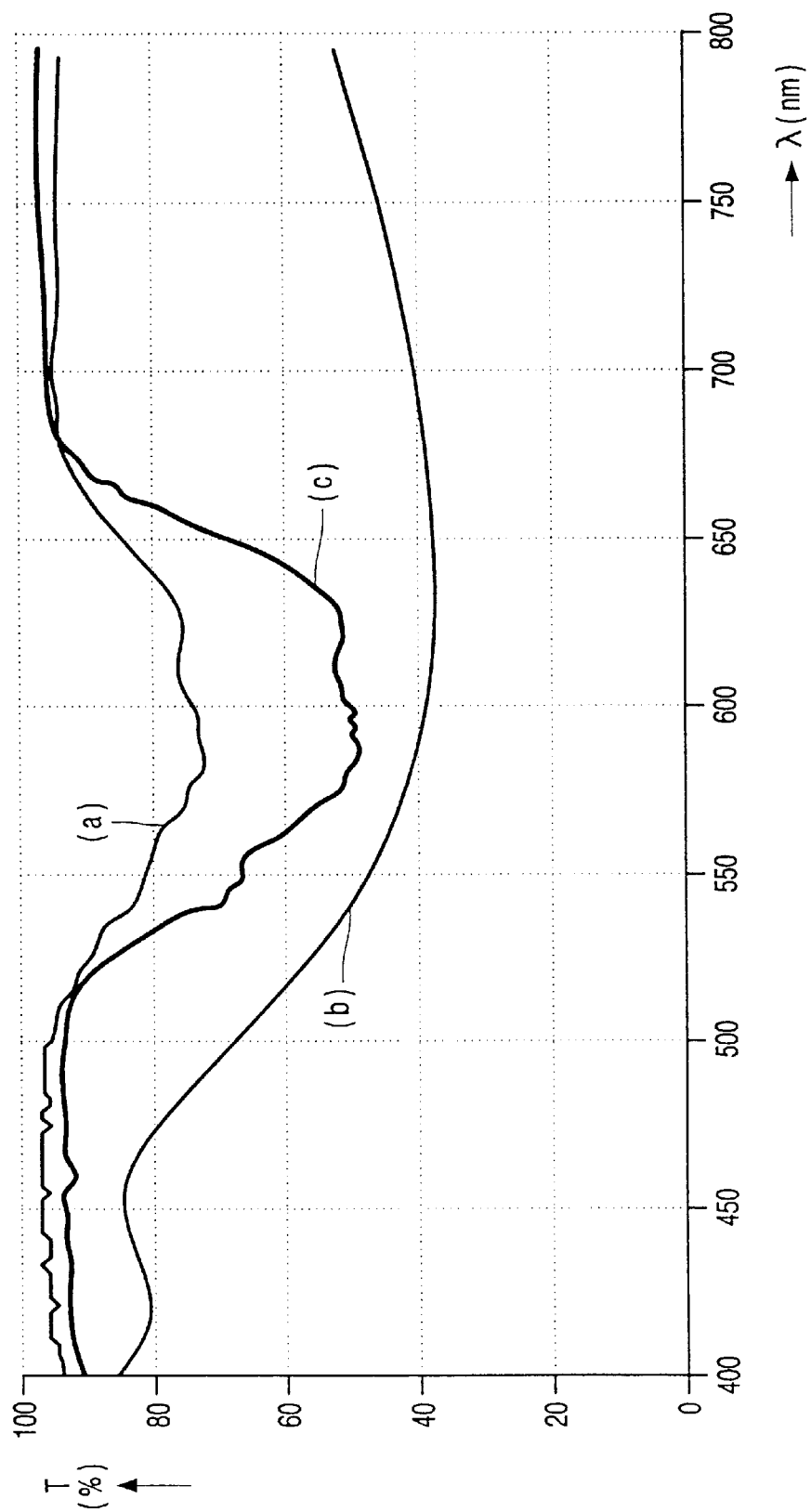
FIGS. 2A and 2B show transmission spectra as a function of the wavelength of a light-absorbing layer of $CoAl_2O_4$ in combination with a three-layer and a seven-layer $SiO_2/Nb_2O_5$ interference film.
Figure 2B:
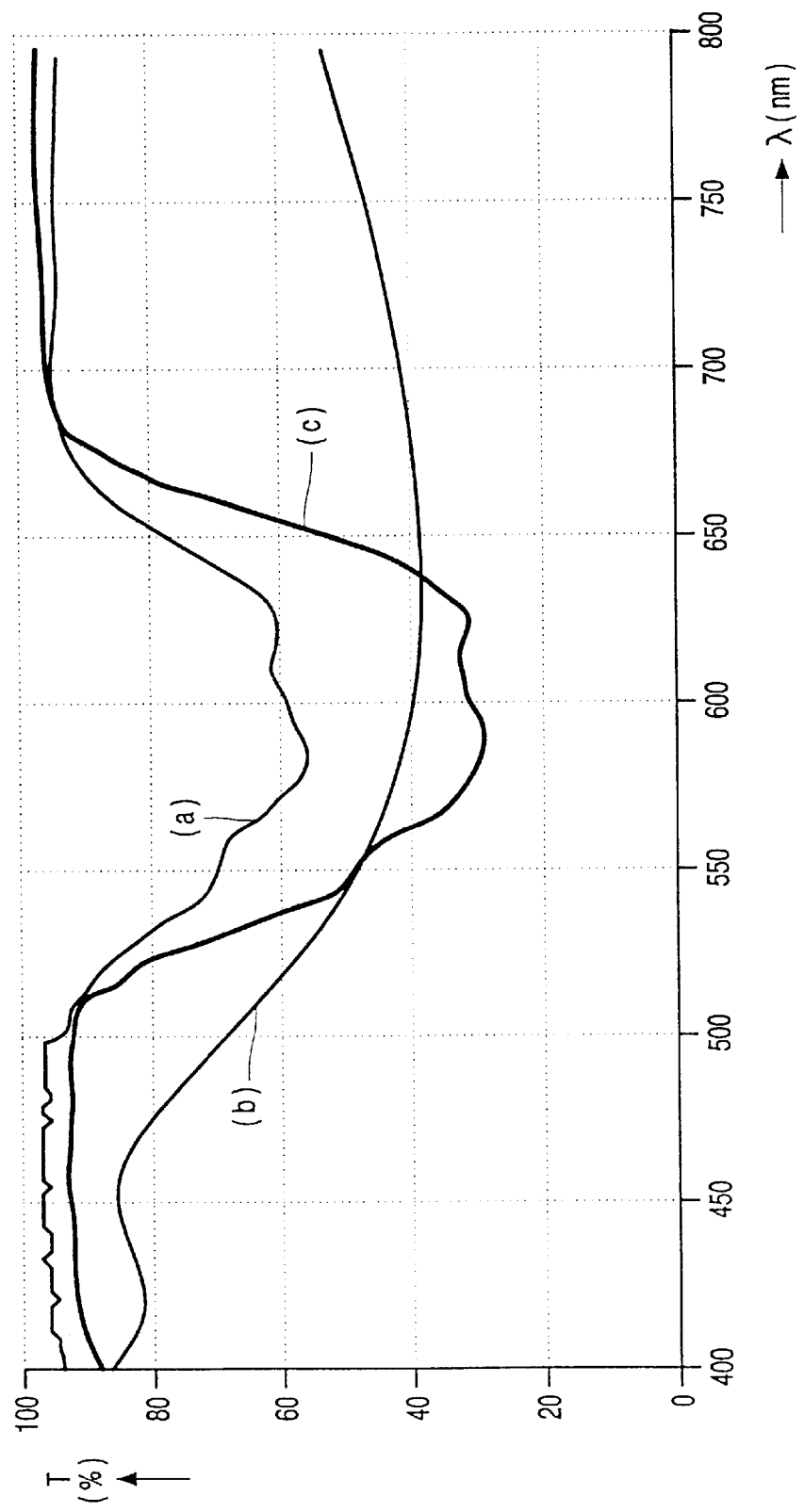

In FIGS. 2A and 2B transmission spectra are shown as a function of the wavelength ($\lambda$ in nm) of a light-absorbing layer of $CoAl_2O_4$ in combination with a three-layer and a seven-layer $SiO_2/Nb_2O_5$ interference film. Curve (a) in FIG. 2A shows the transmission spectrum of a 260 nm thick $CoAl_2O_4$ light-absorbing coating. Curve (b) in FIG. 2A shows the transmission spectrum of a three-layer $SiO_2/Nb_2O_5$ interference film, the layer thicknesses being given by the filter design IF-1 in Table I. Curve (c) in FIG. 2A shows the transmission spectrum of the combination of the 260 nm thick $CoAl_2O_4$ light-absorbing coating and the three-layer $SiO_2/Nb_2O_5$ interference film. Curve (a) in FIG.

2B correspondingly shows the transmission spectrum of a 500 nm thick $CoAl_2O_4$ light-absorbing coating. Curve (b) in FIG. 2B shows the transmission spectrum of the same three-layer $SiO_2/Nb_2O_5$ interference film as in FIG. 2A. Curve (c) in FIG. 2B shows the transmission spectrum of the combination of the 500 nm thick $CoAl_2O_4$ light-absorbing coating and the three-layer $SiO_2/Nb_2O_5$ interference film of Table I.

Figure 3A:
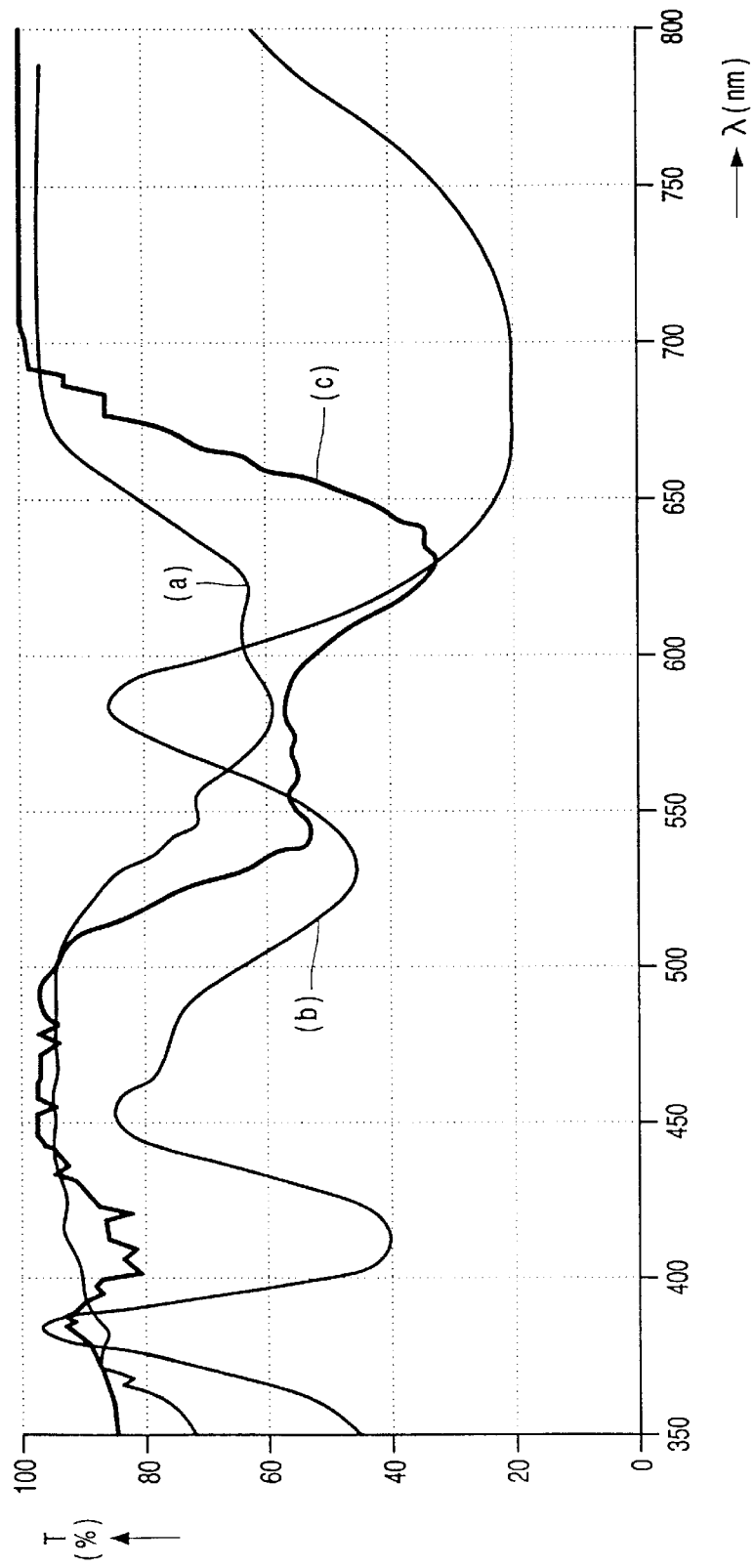
FIGS. 3A and 3B show transmission spectra as a function of the wavelength of a 500 nm thick light-absorbing layer of $CoAl_2O_4$ in combination with two different seven-layer $SiO_2/Nb_2O_5$ interference films.
Figure 3B:
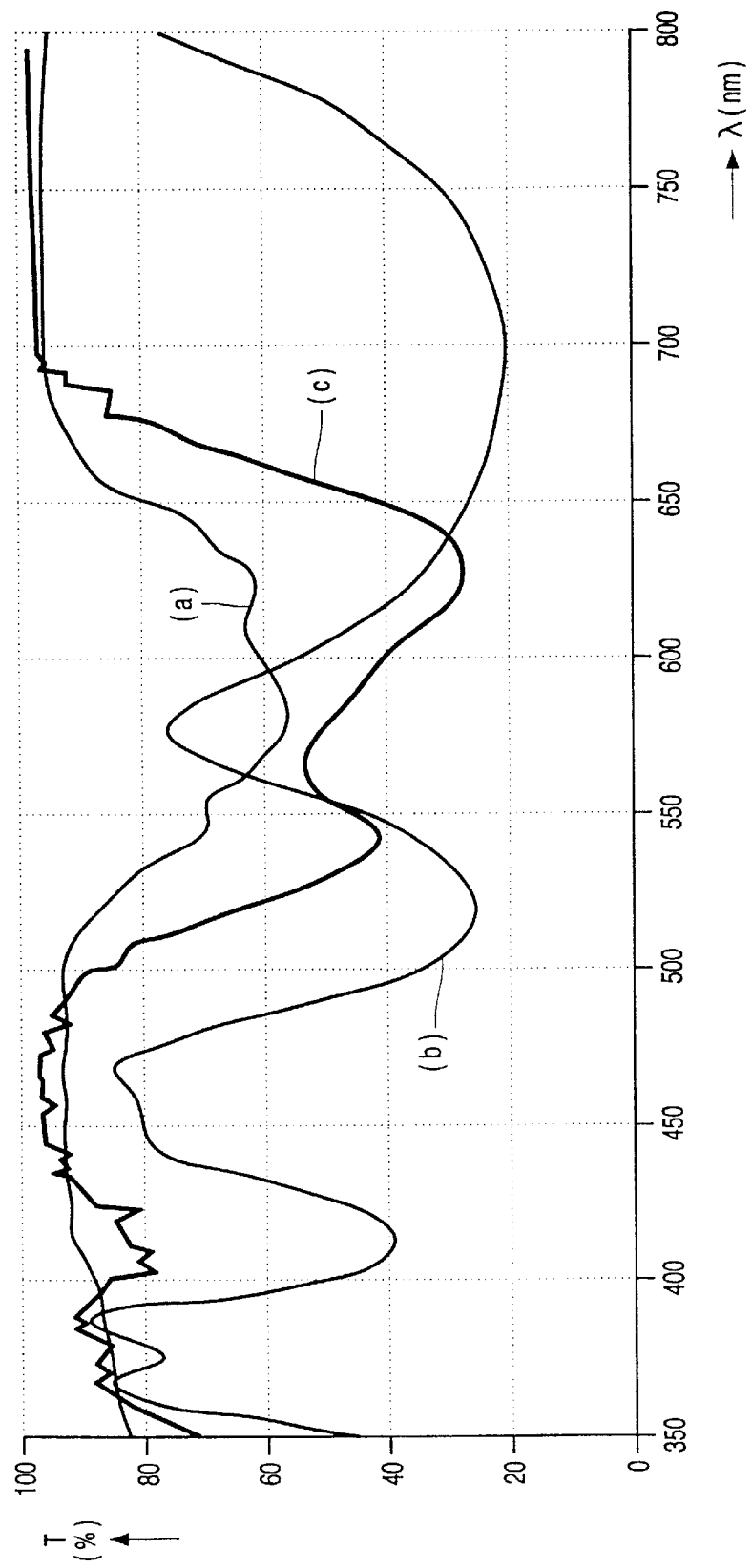

FIGS. 3A and 3B show transmission spectra as a function of the wavelength ($\lambda$ in nm) of a 500 nm thick light-absorbing layer of $CoAl_2O_4$ in combination with two different seven-layer $SiO_2/Nb_2O_5$ interference films. The curves (a) in FIG. 3A and in FIG. 3B show the transmission spectrum of a 500 nm thick $CoAl_2O_4$ light-absorbing coating. Curve (b) in FIG. 3A shows the transmission spectrum of a seven-layer $SiO_2/Nb_2O_5$ interference film, the layer thicknesses being given by the filter design IF-2 in Table II. Curve (c) in FIG. 3A shows the transmission spectrum of the combination of the 500 nm thick $CoAl_2O_4$ light-absorbing coating and the seven-layer $SiO_2/Nb_2O_5$ interference film of Table II. Curve (b) in FIG. 3B correspondingly shows the transmission spectrum of a seven-layer $SiO_2/Nb_2O_5$ interference film, the layer thicknesses being given by the filter design IF-3 in Table III, and curve (c) in FIG. 3B shows the transmission spectrum of the combination of the 500 nm thick $CoAl_2O_4$ light-absorbing coating and the seven-layer $SiO_2/Nb_2O_5$ interference film of Table III.

In Table IV, the color temperature $T_c$, the transmission efficiency $P_{vis}$, and the color co-ordinates (x; y) in accordance with the definition of the 1931 C.I.E. color triangle of an electric lamp are given for four values of the thickness of the $CoAl_2O_4$ coating, using a 3000 K blackbody radiator as the light source. For comparison, Table IV also lists the transmission efficiency and the color co-ordinates of an uncoated electric lamp.

TABLE IV

Optical properties of an electric lamp provided with a $CoAl_2O_4$ light-absorbing layer of different layer thicknesses.

| Layer Thickness $CoAl_2O_4$ (nm) | $T_c$ (K) | $P_{vis}$ (%) | x | y |
|---|---|---|---|---|
| 0 | 3000 | 100 | 0.437 | 0.404 |
| 260 | 3200 | 81 | 0.420 | 0.397 |
| 500 | 3500 | 70 | 0.405 | 0.391 |
| 800 | 3900 | 59 | 0.385 | 0.382 |
| 1000 | 4300 | 52 | 0.372 | 0.376 |

Table IV shows that the color temperature increases with the thickness of the $CoAl_2O_4$ coating. A drawback of a relatively thicker light-absorbing coating resides in that the light output $P_{vis}$ of the lamp decreases (up to almost 50% at a layer thickness of $CoAl_2O_4$ of 1 $\mu$m) and that, at the given color temperature, the distance between the color co-ordinates and the backbody locus increases. Both effects are disadvantageous and undesirable.

Table V lists the optical properties of an electric lamp whose lamp vessel is coated with a combination of a light-absorbing layer of $CoAl_2O_4$ and various $SiO_2/Nb_2O_5$ interference films. The filter designs IF-1, IF-2 and IF-3 for the $SiO_2/Nb_2O_5$ interference films correspond to the values of the layer thicknesses given in, respectively, Table I, II and III.

TABLE V

Optical properties of an electric lamp provided with a combination of a $CoAl_2O_4$ light-absorbing layer of different layer thicknesses and various $SiO_2/Nb_2O_5$ interference films.

| Interference Film | Layer Thickness $CoAl_2O_4$ (nm) | $T_c$ (K) | $P_{vis}$ (%) | x | y |
|---|---|---|---|---|---|
| None | 260 | 3200 | 81 | 0.420 | 0.397 |
|  | 500 | 3500 | 70 | 0.405 | 0.391 |
| IF-1 | 260 | 3900 | 65 | 0.385 | 0.386 |
|  | 500 | 4700 | 50 | 0.353 | 0.371 |
| IF-2 | 260 | 3700 | 68 | 0.394 | 0.389 |
|  | 500 | 4400 | 53 | 0.367 | 0.373 |
| IF-3 | 260 | 3600 | 67 | 0.396 | 0.386 |
|  | 500 | 4200 | 51 | 0.370 | 0.368 |

Table V shows that the color temperature $T_c$ of an electric lamp whose lamp vessel is provided with a combination of the light-absorbing coating and the interference film is higher than that of an electric lamp whose lamp vessel only comprises a light-absorbing coating. As a result of the combination of the light-absorbing coating and the interference film, the light output $P_{vis}$ of the electric lamp is lower than that of a lamp comprising only a light-absorbing coating, however, at the given increase of the color temperature, the light output of the electric lamp is substantially higher than that of a lamp wherein the same increase in color temperature is achieved by only applying the light-absorbing coating.

In the case of an electric lamp comprising an amber-colored coating, for example, a layer of 80–100 nm $Fe_2O_3$ is used, whereby the electric lamp obtains color coordinates which only approximately meet the specified European ECE standard for amber-colored indicators and/or the specified American SAE standard for amber-colored indicators, which standards are known to those skilled in the art. Such a light-absorbing coating, applied to an electric lamp, can suitably be used as an amber-colored indicator and passes the Fakra test known to those skilled in the art.

A combination of an amber-colored coating and an interference film applied to a lamp vessel comprises, for example, a 100 nm $Fe_2O_3$ layer and a ten-layer $TiO_2/SiO_2$ filter, which, in accordance with a notation known to those skilled in the art, is referred to as:

glass|$Fe_2O_3$|(LH)$^5$|air wherein the geometrical layer thicknesses of the materials having a low and a high refractive index are, respectively, L=50 nm $SiO_2$ and H=50 nm $TiO_2$. The color co-ordinates (x; y) of an electric lamp provided with said combination are (0.575; 0.423) in the tranmission mode and (0.245; 0.278) in the reflection mode. This combination amply meets, in the transmission mode, the ECE-standard for amber-colored indicators. Such an electric lamp has a color-neutral appearance in the off-state.

It will be clear that, within the scope of the invention, many variations are possible to those skilled in the art.

The scope of protection of the invention is not limited to the examples given hereinabove. The invention is embodied in each novel characteristic and each combination of characteristics. Reference numerals in the claims do not limit the scope of the protection thereof. The use of the word "comprising" does not exclude the presence of elements other than those mentioned in the claims. The use of the word "a" or "an" in front of an element does not exclude the presence of a plurality of such elements.

What is claimed is:

1. An electric lamp comprising
   a light-transmitting lamp vessel (1; 11) wherein a light source (2; 12) is arranged; and
   a light-absorbing medium (16) overlaying at least a portion of an outer surface of the lamp vessel;
   wherein at least a part of the lamp vessel (1; 11) being provided with an interference film (5; 15), and
   wherein light originating from the light source (2; 12) reaches the interference film (5; 15) mainly via the light-absorbing medium (16).

2. An electric lamp as claimed in claim 1, characterized in that a wall of the lamp vessel (1) comprises the light-absorbing medium.

3. An electric lamp as claimed in claim 1, characterized in that the light-absorbing medium (16) comprises a light-absorbing layer which is situated between the lamp vessel (11) and the interference film (15).

4. An electric lamp as claimed in claim 3, characterized in that a thickness $t_{tabs}$ of the light-absorbing medium (16) lies in the range $50 \leq t_{tabs} \leq 1000$ nm.

5. An electric lamp as claimed in claim 1, characterized in that the interference film (5, 15) reflects predominantly in a wavelength range wherein the light-absorbing medium (16) absorbs.

6. An electric lamp as claimed in claim 1, characterized in that the light-absorbing medium (16) absorbs mainly in a wavelength range from 570 to 620 nm.

7. An electric lamp as claimed in claim 1, characterized in that the electric lamp emits colored light in the on-state and has a color-neutral appearance in the off-state.

8. An electric lamp as claimed in claim 7, characterized in that the light-absorbing medium (16) comprises an amber-colored transmission.

9. An electric lamp as claimed in claim 1, characterized in that the light-absorbing medium (16) is selected from the group formed by iron oxide, iron oxide doped with phosphor, zinc iron oxide, cobalt aluminate, neodymium oxide, bismuth vanadate, zirconium praseodymium silicate or mixtures thereof.

10. An electric lamp as claimed in claim 1, characterized in that the interference film (5; 15) comprises layers composed of, alternately, a first layer of a material and a second layer of a material, wherein the material of the first layer has a lower refractive index than the material of the second layer.

11. An electric lamp as claimed in claim 10, characterized in that the first layer of the interference film (5; 15) predominantly comprises silicon oxide, and the second layer of the interference film (5; 15) predominantly comprises a material having a refractive index which is greater than the refractive index of silicon oxide.

12. An electric lamp as claimed in claim 11, characterized in that the second layer of the interference film (5; 15) comprises a material which is selected from the group formed by titanium oxide, niobium oxide, tantalum oxide, zirconium oxide, hafnium oxide, silicon nitride and combinations of said materials.

* * * * *